(12) United States Patent
Morimoto et al.

(10) Patent No.: US 11,269,831 B2
(45) Date of Patent: Mar. 8, 2022

(54) CORRELATION DISPLAY SYSTEM, CORRELATION DISPLAY METHOD, AND CORRELATION DISPLAY PROGRAM

(71) Applicant: FRONTEO, INC., Tokyo (JP)

(72) Inventors: Masahiro Morimoto, Tokyo (JP); Hideki Takeda, Tokyo (JP); Kazumi Hasuko, Tokyo (JP); Jakob Halskov, Tokyo (JP); Akiteru Hanatani, Tokyo (JP)

(73) Assignee: FRONTEO, INC., Tokyo (JP)

( * ) Notice: Subject to any disclaimer, the term of this patent is extended or adjusted under 35 U.S.C. 154(b) by 415 days.

(21) Appl. No.: 14/902,329

(22) PCT Filed: Mar. 17, 2014

(86) PCT No.: PCT/JP2014/057068
§ 371 (c)(1),
(2) Date: Dec. 30, 2015

(87) PCT Pub. No.: WO2015/025551
PCT Pub. Date: Feb. 26, 2015

(65) Prior Publication Data
US 2016/0371309 A1    Dec. 22, 2016

(30) Foreign Application Priority Data

Aug. 23, 2013 (JP) .............................. JP2013-173117
Dec. 27, 2013 (JP) .............................. JP2013-272124

(51) Int. Cl.
*G06F 16/22* (2019.01)
*G06F 16/248* (2019.01)
*G06F 16/2457* (2019.01)
*H04L 29/08* (2006.01)
(Continued)

(52) U.S. Cl.
CPC ........ *G06F 16/2228* (2019.01); *G06F 16/248* (2019.01); *G06F 16/24578* (2019.01);
(Continued)

(58) Field of Classification Search
CPC ....... G06Q 10/10; G06Q 10/107; G06Q 50/18
See application file for complete search history.

(56) References Cited

U.S. PATENT DOCUMENTS 8,312,056 B1 * 11/2012 Peng ...................... G06Q 50/01
707/802
2005/0076053 A1    4/2005 Katayama et al.
(Continued)

FOREIGN PATENT DOCUMENTS

JP    2005108123 A    4/2005
JP    2005244647 A    9/2005
(Continued)

OTHER PUBLICATIONS

Wikipedia contributors. (Aug. 18, 2013). Morpheme. In Wikipedia, The Free Encyclopedia. Retrieved 18:41, Jul. 13, 2021, from https://en.wikipedia.org/w/index.php?title=Morpheme&oldid=569026455 (Year: 2013).*
(Continued)

*Primary Examiner* — William Spieler
(74) *Attorney, Agent, or Firm* — Brundidge & Stanger, P.C.

(57) ABSTRACT

A correlation display system, correlation display method, and correlation display program capable of outputting the relationship between a plurality of persons in a manner visibly recognizable by a user are provided. A correlation display system 1 includes: a communication data acquisition unit 10 that acquires communication data transmitted and received between a plurality of terminals and thereby associated with each of a plurality of persons; an analysis unit 12 that analyzes content of the communication data acquired by the communication data acquisition unit 10; an evaluation unit 16 that evaluates the relationship between the content of the communication data and a predetermined event by using an analysis result of the analysis unit 12; and a display unit
(Continued)

18 that displays the relationship between a plurality of persons related to the event on the basis of an evaluation result of the evaluation unit 16.

11 Claims, 2 Drawing Sheets

(51) Int. Cl.
　　　*G06F 16/335*　　(2019.01)
　　　*G06Q 30/02*　　(2012.01)
　　　*H04L 67/50*　　(2022.01)
(52) U.S. Cl.
　　　CPC ....... *G06F 16/335* (2019.01); *G06Q 30/0201* (2013.01); *H04L 67/22* (2013.01)

(56) References Cited

U.S. PATENT DOCUMENTS

| | | | |
|---|---|---|---|
| 2008/0097994 A1 | 4/2008 | Teramoto et al. | |
| 2009/0150168 A1* | 6/2009 | Schmidt | G06Q 10/10 705/311 |
| 2012/0239666 A1 | 9/2012 | Morimoto et al. | |
| 2013/0135314 A1* | 5/2013 | Haggerty | G06Q 10/107 345/440 |
| 2013/0345971 A1* | 12/2013 | Stamm | H04W 4/029 701/465 |

FOREIGN PATENT DOCUMENTS

| | | |
|---|---|---|
| JP | 2008107867 A | 5/2008 |
| JP | 2009122834 A | 6/2009 |
| JP | 2009146253 A | 7/2009 |
| JP | 2012181851 A | 9/2012 |
| WO | 2011122432 A1 | 10/2011 |

OTHER PUBLICATIONS

International Search Report for PCT/JP2014/057068 dated May 20, 2014, 9 pages.

* cited by examiner

… of the communication data and a predetermined event by using an analysis result of the analysis step; and a display step of displaying a relationship of the domain information related to the event on the basis of an evaluation result of the evaluation step.

Furthermore, in order to achieve the above-mentioned object, the present invention provides a correlation display program for displaying a relationship between a plurality of persons, the correlation display program having a computer implement: a communication data acquisition function that acquires communication data transmitted and received between a plurality of terminals and thereby associated with each of a plurality of persons; an analysis function that analyzes content of the communication data acquired by the communication data acquisition function; an evaluation function that evaluates a relationship between the content of the communication data and a predetermined event by using an analysis result of the analysis function; and a display function that displays a relationship between a plurality of persons related to the event on the basis of an evaluation result of the evaluation function.

Furthermore, in order to achieve the above-mentioned object, the present invention provides a correlation display program for displaying a relationship between a plurality of persons, the correlation display program having a computer implement: a communication data acquisition function that acquires communication data transmitted and received between a plurality of terminals and thereby associated with each of a plurality of persons; an analysis function that analyzes domain information of the communication data acquired by the communication data acquisition function; an evaluation function that evaluates a relationship between the domain information of the communication data and a predetermined event by using an analysis result of the analysis function; and a display function that displays a relationship of the domain information related to the event on the basis of an evaluation result of the evaluation function.

Advantageous Effects of Invention

If a digital correlation display system, correlation display method, and correlation display program according to the present invention are employed, it is possible to provide a correlation display system, correlation display method, and correlation display program capable of outputting the relationship between a plurality of persons in a manner visibly recognizable by a user.

DETAILED DESCRIPTION

Embodiment

Figure 1:
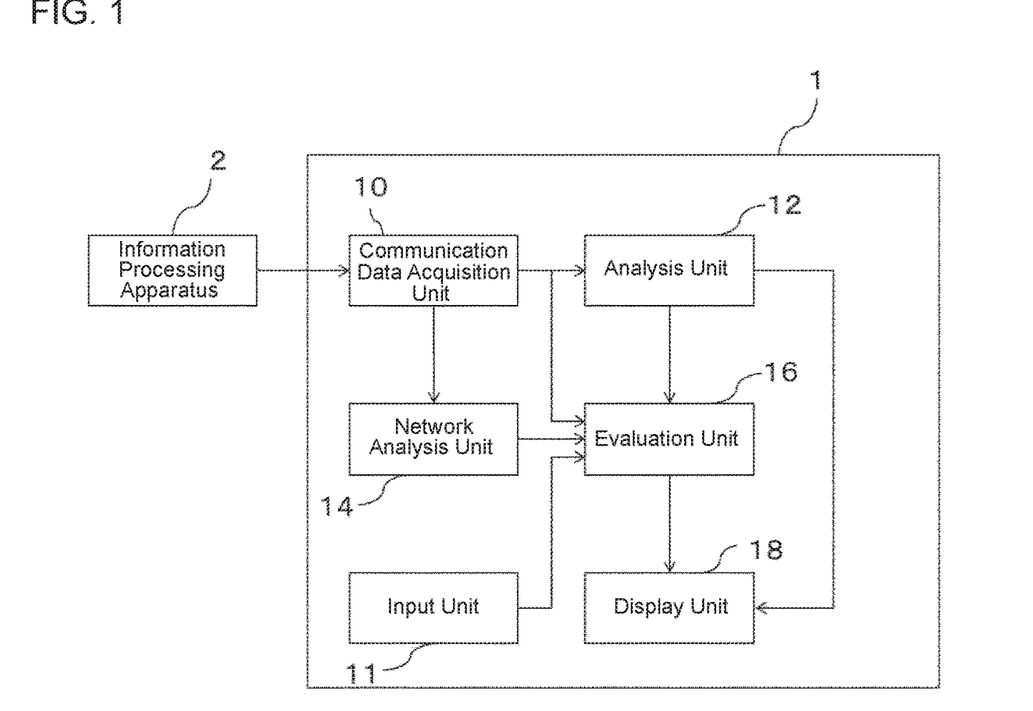
FIG. 1 is a functional configuration block diagram of a correlation display system according to this embodiment.
Figure 2:
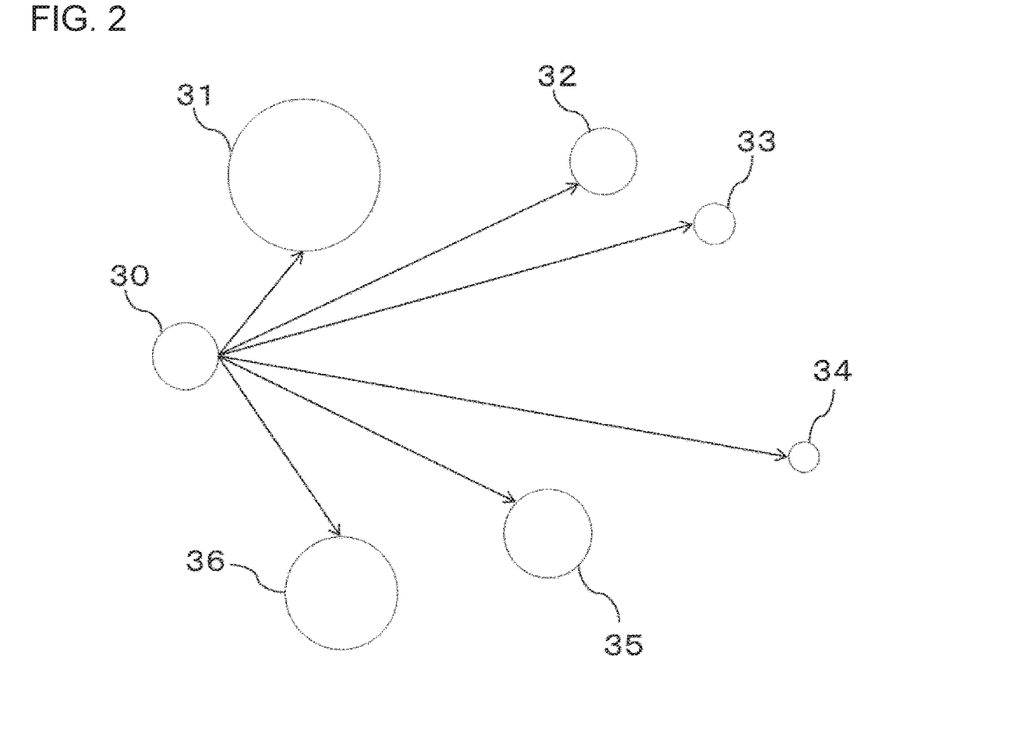
FIG. 2 is a diagram illustrating a display mode of a display unit for the correlation display system according to this embodiment.

FIG. 1 illustrates an example of a functional configuration block of a correlation display system according to this embodiment. Furthermore, FIG. 2 illustrates an example of a display mode of a display unit for the correlation display system according to this embodiment.

Outline of Correlation Display System 1

A correlation display system 1 according to this embodiment is a system that automatically displays the relationship between a plurality of persons by analyzing communication data related to a predetermined event from among a plurality of pieces of communication data stored in information processing apparatuses 2 such as user terminals or servers. The predetermined event herein used is information indicating that, for example, it is related to a lawsuit. Then, for example, if a computer-related crime or legal dispute such as an unauthorized access or confidential information leakage arises, the correlation display system 1 according to this embodiment can be applied to forensics that is technology to collect and analyze digital information, which is digital records required for a search or investigation into the cause of the crime or dispute, and clarify its legal evidentiality.

The correlation display system 1 according to this embodiment firstly analyzes the content of a plurality of pieces of communication data transmitted and received between a plurality of information processing apparatuses 2 as a plurality of terminals. Under this circumstance, each piece of communication data includes information indicating that the communication data has been transmitted from one person to another person. Furthermore, the communication data may include information for identifying an organization unit, to which one person belongs (such as a subsection, a section, a department, or a company), and information for identifying an organization unit to which the other person belongs (such as a subsection, a section, a department, or a company). Furthermore, the communication data is stored in the plurality of information processing apparatuses 2 or a server connected to the plurality of information processing apparatuses 2 in a manner such that the server can communicate with the plurality of information processing apparatuses 2.

Then, the correlation display system 1 displays to what extent exchanging of information about a predetermined event has been executed between one person and the other person or to what extent exchanging of important information about the information about the predetermined event has been executed, on the basis of the analysis result in a manner visibly recognizable by a user.

Specifically speaking, the correlation display system 1 analyzes the content of communication data (such as e-mails) transmitted and received between an information processing apparatus 2 belonging to one person and an information processing apparatus 2 belonging to another person. Then, the correlation display system 1 analyzes whether the content of the communication data includes information about the predetermined event or not. When the correlation display system 1 obtains the analysis result indicating that the information related to the relevant event is included in the communication data, it evaluates the relation between the relevant communication data and the relevant event. For example, the correlation display system 1 evaluates how highly or lowly the content of the relevant communication data is related to the relevant event. Then, when the correlation display system 1 obtains an evaluation result indicating that the relevant communication data is related to the relevant event, or an evaluation result that they are highly or lowly related to each other, the correlation display system 1 displays the relationship between one person and the other person on, for example, a monitor.

For example, the correlation display system 1 displays a plurality of nodes on the monitor by associating the respective persons with the nodes and displays one node and another node on the basis of the evaluation result. For example, the correlation display system 1 displays one node associated with one person and another node associated with another person by coupling them together with an arrow indicative of a flow of the communication data. Furthermore, when the correlation display system 1 displays one node and the other node, it changes and displays a mode of the nodes depending on, for example, the number of times or frequency at which information about the predetermined event has been exchanged from the one node to the other node, or importance of the exchanged information.

For example, the correlation display system 1 changes and displays the size, color, and/or shape of the nodes. Furthermore, the correlation display system 1 can also change and display the width, color, and/or length of the arrow which couples the respective nodes.

Incidentally, a server(s) according to this embodiment is one or more servers and can be configured by including plurality of servers. For example, the servers include servers capable of storing digital information, such as mail servers, file servers, or document management servers. Furthermore, an information processing apparatus(es) 2 as a terminal(s) is one or more terminals and can be configured by including a plurality of information processing apparatuses 2. For example, the information processing apparatuses 2 include personal computers, notebook computers, tablet PCs, or potable communication terminals such as cell phones.

Details of Correlation Display System 1

The correlation display system 1 according to this embodiment includes: a communication data acquisition unit 10 that acquires communication data transmitted and received between a plurality of information processing apparatuses 2; an analysis unit 12 that analyzes content of the communication data acquired by the communication data acquisition unit 10; an evaluation unit 16 that evaluates a relationship between the content of the communication data and a predetermined event by using an analysis result of the analysis unit 12; and a display unit 18 that displays a relationship between a plurality of persons on the basis of an evaluation result of the evaluation unit 16. Furthermore, the correlation display system 1 further includes: an input unit 11 that acquires information for associating part of the communication data acquired by the communication data acquisition unit 10 with the relationship with the predetermined event; and a network analysis unit 14 that determines a plurality of main terminals in a communication network configured of a plurality of terminals.

Incidentally, the correlation display system 1 and the information processing apparatus 2 are connected to each other via, for example, a communication network such as the Internet or a wired or wireless network such as a LAN so that they can communicate with each other. Furthermore, the correlation display system 1 can also include part or all of functions and configurations of the information processing apparatus 2. Furthermore, FIG. 1 illustrates one information processing apparatus 2, but a plurality of information processing apparatuses 2 can be connected to the correlation display system 1 so that they can communicate with each other.

Communication Data Acquisition Unit 10

The communication data acquisition unit 10 acquires the communication data which are transmitted and received between a plurality of information processing apparatuses 2 as a plurality of terminals and associated with a plurality of persons, respectively. The communication data include, for example, at least one of e-mails, a telephone call log, a log of accesses to a social network service, and information (such as domains) representing identification of individual computers or servers. Furthermore, the communication data can also include document file data attached to the communication data. Incidentally, the communication data are stored in the information processing apparatuses 2 or data servers. The communication data acquisition unit 10 acquires a plurality of pieces of communication data which are stored in a plurality of information processing apparatuses 2 or data servers. The communication data acquisition unit 10 supplies the acquired communication data to the analysis unit 12 and the network analysis unit 14.

Analysis Unit 12

The analysis unit 12 analyzes the content of the communication data received from the communication data acquisition unit 10. Specifically speaking, the analysis unit 12 analyzes text data included in the content of the communication data by using a text mining method, an image recognition method, or a sound recognition method. Then, the analysis unit 12 analyzes whether texts, images, or sounds related to a predetermined event are included in the content of the communication data or not. The predetermined event herein used means information indicating that it is related to, for example, a lawsuit. Furthermore, the information may relate to not only lawsuits, but also human relationships of fraud investigations, and correlations of personal, accounting, and technical information with respect to M&A and intellectual properties.

For example, the analysis unit 12 has a dictionary unit that stores text data (including data converted into texts by the aforementioned image recognition method and the sound recognition method) which are indicative of words related to the predetermined event. The analysis unit 12 analyzes whether or not any texts related to the relevant event are included in the content of the communication data by analyzing the text data included in the content of the communication data by using the text data stored in the dictionary unit. The analysis unit 12 supplies the analysis result to the evaluation unit 16.

Network Analysis Unit 14

The network analysis unit 14 determines a plurality of main terminals in a communication network, which is configured of a plurality of terminals, from among the plurality of terminals by analyzing the communication network by using the communication data. For example, the network analysis unit 14 determines the plurality of main terminals on the basis of frequency at which the plurality of terminals appear in a shortest path between the respective terminals in the communication network. For example, the network analysis unit 14 determines the plurality of main terminals by using Vertex betweenness centrality or the like as an analysis algorithm. The network analysis unit 14 supplies information indicative of the analysis result to the evaluation unit 16.

Evaluation Unit 16

The evaluation unit 16 evaluates the relationship between the content of the communication data and the predetermined event by using the analysis result of the analysis unit 12. Furthermore, the evaluation unit 16 can also evaluate the relationship between the content of the communication data and the predetermined event by using the communication data transmitted and received between the plurality of main terminals and the analysis result of the analysis unit 12. The evaluation unit 16 can narrow down the communication data transmitted and received between the information processing apparatuses 2, which are highly related to the predetermined event, from among an enormous amount of communication data by evaluating the relevant relationship using the communication data transmitted and received between the main terminals.

For example, the evaluation unit 16 evaluates the relationship between the content of the communication data and the predetermined event by executing processing with automatic coding. For example, the evaluation unit 16 extracts partial communication data from the communication data acquired by the communication data acquisition unit 10. Incidentally, the evaluation unit 16 randomly extracts the partial communication data from the plurality of pieces of communication data. Next, the evaluation unit 16 attaches information, as a code, for associating the relevant partial communication data with the relationship with the predetermined event externally acquired from the input unit 11. The relationship with the predetermined event is information indicating that the communication data is related to the predetermined event, and information indicating how highly or lowly the communication data is related to the predetermined event.

Then, the evaluation unit 16 executes the processing with automatic coding on all pieces of communication data analyzed by the analysis unit 12 or all pieces of communication data analyzed by the analysis unit 12 as including text data related to the predetermined event, by using the communication data to which the information for associating the relationship with the predetermined event is attached as the code. Accordingly, the evaluation unit 16 evaluates whether the communication data transmitted from an information processing apparatus of one person to an information processing apparatus of another person is related to the predetermined event or not, and how highly or lowly the relevant communication data is related to the predetermined event. Furthermore, the evaluation unit 16 may evaluate whether the communication data transmitted from an information processing apparatus of one domain to an information processing apparatus of another domain is related to the predetermined event or not, and how highly or lowly the relevant communication data is related to the predetermined event. The domain information may represent identification of an individual computer or may be an identifier after @ in an e-mail address.

For example, the evaluation unit 16 evaluates whether an e-mail transmitted from an information processing apparatus of a first person to an information processing apparatus of a second person is related to the predetermined event or not. Then, when the relevant e-mail is related to the relevant event, the evaluation unit 16 associates a score with the relevant e-mail. Similarly, the evaluation unit 16 associates scores with all e-mails transmitted from the information processing apparatus of the first person to the information processing apparatus of the second person and adds up the associated scores, thereby calculating a score of the relationship between the first person and the second person. Similarly, the evaluation unit 16 evaluates each of e-mails transmitted from an information processing apparatus of one person to an information processing apparatus of each of a plurality of other persons. Then, the evaluation unit 16 calculates and evaluates a score of each of relationships between the one person and the plurality of other persons.

Furthermore, the evaluation unit 16 evaluates whether an e-mail transmitted from an information processing apparatus of a first domain to an information processing apparatus of a second domain is related to the predetermined event or not. Then, when the relevant e-mail is related to the relevant event, the evaluation unit 16 associates a score with the relevant e-mail. Similarly, the evaluation unit 16 associates scores with all e-mails transmitted from the information processing apparatus of the first domain to the information processing apparatus of the second domain and adds up the associated scores, thereby calculating a score of the relationship between the first domain and the second domain. Similarly, the evaluation unit 16 evaluates each of e-mails transmitted from an information processing apparatus of one domain to an information processing apparatus of each of a plurality of other domains. Then, the evaluation unit 16 calculates and evaluates a score of each of relationships between the one domain and the plurality of other domains.

Incidentally, when the evaluation unit 16 evaluates the relationship on the basis of the analysis result of the communication data, for example, it executes the evaluation as follows. Firstly, the evaluation unit 16 can have a dictionary that: associates a plurality of word combinations related to the predetermined event with scores indicating how highly or lowly they are related to the predetermined event; and stores them. Then, the evaluation unit 16 analyzes text data in the communication data on the basis of morpheme analysis and judges whether the plurality of word combinations stored in the relevant dictionary are included in selected communication data or not.

If the evaluation unit 16 determines that the combinations of words stored in the relevant dictionary are included in the selected communication data, it evaluates how highly or lowly the relevant file is related to the predetermined event on the basis of the scores stored in the dictionary. Then, the evaluation unit 16 associates information indicative of the evaluation result (that is, information indicative of how highly or lowly it is related to the predetermined event) with the selected communication data. As a result, the evaluation unit 16 can evaluate how highly or lowly the communication data is related to the predetermined event.

Furthermore, the evaluation unit 16 can evaluate how highly or lowly the communication data is related to the predetermined event at each transmission/reception time of the communication data by reading data indicative of the transmission/reception time included in the communication data. Furthermore, the evaluation unit 16 can evaluate how highly or lowly the communication data is related to the predetermined event at each execution time when the evaluation is executed. The evaluation unit 16 supplies information indicative of the evaluation result to the display unit 18.

Display Unit 18

The display unit 18 displays the relationship between a plurality of persons related to the predetermined event on the basis of the evaluation result of the evaluation unit 16. The display unit 18 can change a display mode according to the score calculated by the evaluation unit 16 with respect to the relationship between one person and another person.

For example, the display unit 18 analyzes the evaluation result received from the evaluation unit 16 and recognizes each of the plurality of persons related to the predetermined event. Then, the display unit 18 displays each of the persons by associating each person with a circular node as illustrated in FIG. 2; and if there is a relationship between one person and another person, the display unit 18 displays a node corresponding to the one person and a node corresponding to the other person by coupling them together with an arrow. The size of each node indicates how highly or lowly it is related to one node 30. Specifically speaking, when the size of the node is larger, it means that it is highly related to the node 30. In an example of FIG. 2, the node size becomes smaller in the order of a node 31, a node 36, a node 35, a node 32, a node 33, and a node 34. Therefore, the example of FIG. 2 illustrates that the relationship with a person corresponding to the node 30 becomes lower in the order of the node 31, the node 36, the node 35, the node 32, the node 33, the node 34. Incidentally, the display unit 18 can display the score, which is calculated by the evaluation unit 16, in the relevant node.

Furthermore, the display unit 18 can change and display, for example, the width or color of an arrow or line segment that couples the nodes together. For example, the display unit 18 can change the width and color of the arrow or line segment, the type of the line, and the length of the line according to the relationship between a person associated with one node and a person associated with the other node. For example, when the relationship between the person associated with the one node and the person associated with the other node is higher, the display unit 18 uses a wider line segment or a line segment of a highlighted color to display the state in which the one node and the other node are coupled together (for example, a black line is displayed at normal time and a red or yellow line is displayed as a highlighted color).

Furthermore, the display unit 18 can associate not only one person (that is, an individual) with one node, but also a predetermined organization unit (such as a subsection, a section, a department, or a company) with one node. In this case, the analysis unit 12 analyzes the content of the communication data and groups the plurality of pieces of communication data into predetermined organization units. Then, the analysis unit 12 supplies information indicative of a grouping result to the display unit 18.

Furthermore, after displaying a first relationship between a plurality of persons on the basis of the analysis result of the analysis unit 12, the display unit 18 can display a second relationship between a plurality of persons obtained by reflecting the evaluation result of the evaluation unit 16 in the first relationship. Specifically speaking, the display unit 18 firstly displays the first relationship on the basis of only the analysis result of the analysis unit 12 using text mining. Subsequently, when the evaluation result of the evaluation unit 16 is generated by using the processing with automatic coding, the display unit 18 can change the first relationship to the second relationship by using the relevant evaluation result and display the second relationship.

Furthermore, the display unit 18 can also dynamically change the display of the relationship between a plurality of persons on the basis of the evaluation result of the evaluation unit 16 at each transmission/reception time or each execution time. For example, the display unit 18 displays a transmitted/received amount of communication data (such as e-mails) between the respective nodes at every specified time interval in a manner visibly recognizable by the user. For example, the display unit 18 displays the amount of communication data exchanged between the respective nodes by changing the size of the nodes and the width of the relevant lines in a chronological order. Consequently, the display unit 18 can highlight the relationship between persons regarding which the transmitted/received amount has been rapidly increasing since a certain point in time. Therefore, the correlation display system 1 can identify a person whose transmitted/received communication data amount has been rapidly increasing since the occurrence of a specified case.

Furthermore, the display unit 18 can display the relationship between a plurality of persons at each time when the evaluation is executed by the evaluation unit 16. Specifically speaking, the display unit 18 can dynamically change and display the relationship between the plurality of persons on a real-time basis every time the evaluation is executed by the evaluation unit 16 and the evaluation result is changed. The display unit 18 may display the relationship including the aforementioned nodes with respect to domain information instead of the persons. In a case of the domain information, the analysis unit 18 executes the analysis to include the nodes representing the aforementioned persons in the node 31 and the display unit 18 may represent the nodes representing the persons within the node of the domain information on the basis of the analysis result. Furthermore, the display unit 18 may display the relationship between a plurality of pieces of domain information related to the predetermined event on the basis of the evaluation result of the evaluation unit 16.

Outline of Correlation Display Method

Figure 3:
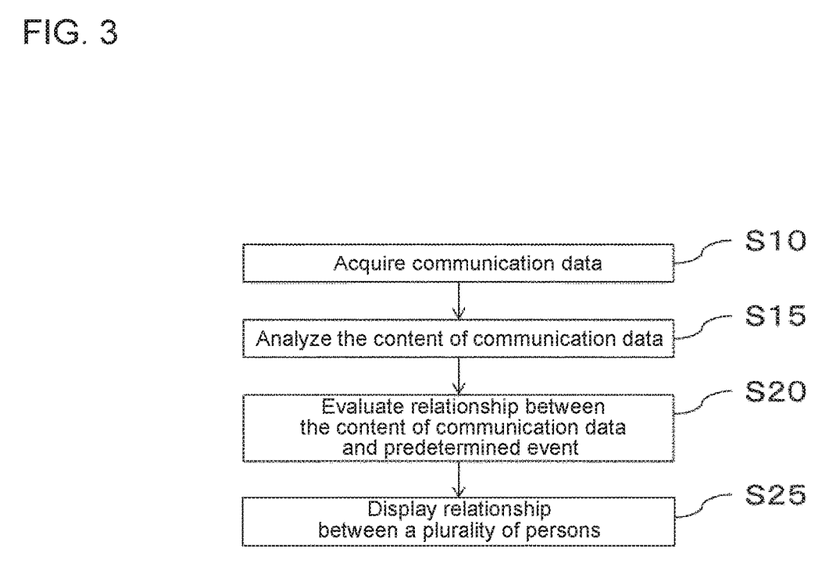
FIG. 3 is a flowchart of the correlation display system according to an embodiment of the present invention.

FIG. 3 illustrates an example of a processing flow of the correlation display system according to an embodiment of the present invention. The communication data acquisition unit 10 firstly acquires the communication data from the information processing apparatus 2 or the server which stores the communication data transmitted and received between a plurality of information processing apparatuses 2 (step 10; and "step" will be hereinafter represented by "S"). The communication data acquisition unit 10 supplies the acquired communication data to the analysis unit 12, the network analysis unit 14, and/or the evaluation unit 16 in response to actions from the analysis unit 12, the network analysis unit 14, and the evaluation unit 16.

The analysis unit 12 analyzes the content of the communication data acquired from the communication data acquisition unit 10 (S15). For example, the analysis unit 12 analyzes the content of the text data included in the communication data by using the text mining method. For example, the analysis unit 12 analyzes whether words related to the predetermined event are included in the communication data or not. The analysis unit 12 supplies the analysis result to the evaluation unit 16 and the display unit 18.

The evaluation unit 16 evaluates the relationship between the content of the communication data and the predetermined event (S20). The evaluation unit 16 evaluates the relevant relationship by using, for example, the method of the processing with automatic coding. The evaluation unit 16 supplies the evaluation result to the display unit 18. The display unit 18 displays, on an output device such as a monitor, the relationship between a plurality of persons on the basis of the evaluation result received from the evaluation unit 16 in a manner visibly recognizable by the user (S25).

Figure 4:
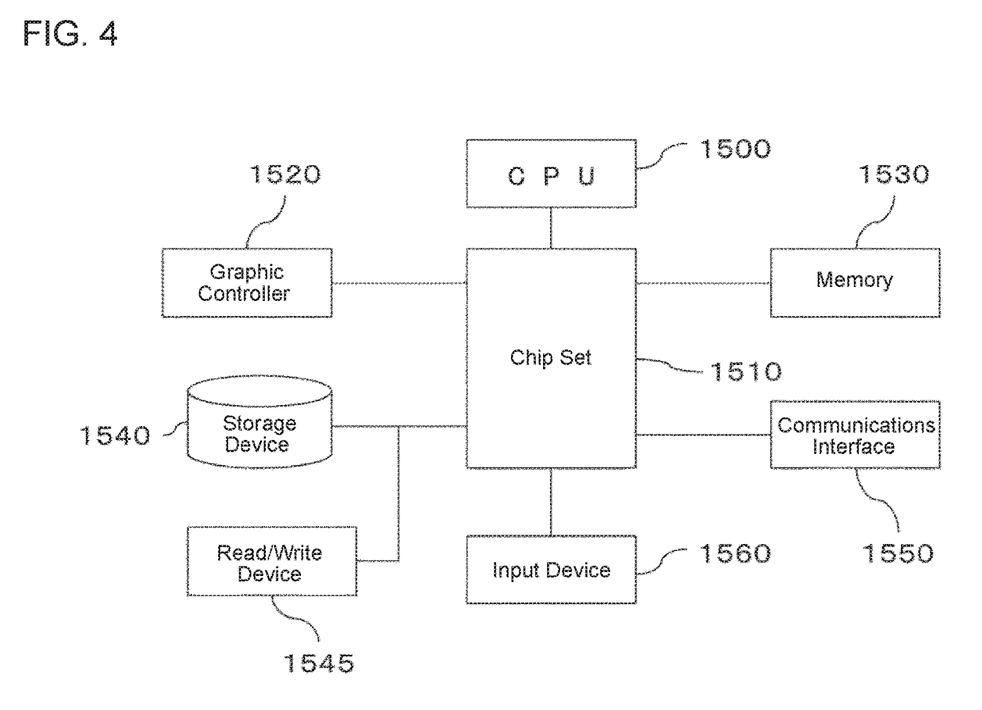
FIG. 4 is a hardware configuration diagram of the correlation display system according to this embodiment.

FIG. 4 illustrates an example of a hardware configuration of the correlation display system according to an embodiment of the present invention.

The correlation display system 1 according to this embodiment includes: a CPU 1500; a graphic controller 1520; a memory 1530 such as a Random Access Memory (RAM), Read-Only Memory (ROM) and/or flash ROM; a storage device 1540 that stores data; a read/write device 1545 that reads data from a storage medium and/or writes the data to the storage medium; an input device 1560 that inputs data; a communications interface 1550 that transmits and receives data to and from external communication equipment; and a chip set 1510 that connects the CPU 1500, the graphic controller 1520, the memory 1530, the storage device 1540, the read/write device 1545, the input device 1560, and the communications interface 1550 to each other so that they can communicate with each other.

The chip set 1510 executes delivery of data between the respective components by mutually connecting the memory 1530, the CPU 1500 which accesses the memory 1530 and executes specified processing, and the graphic controller 1520 which controls the display of an external display device. The CPU 1500 controls each component by operating according to programs stored in the memory 1530. The graphic controller 1520 has a specified display device display images on the basis of image data temporarily accumulated in a buffer provided in the memory 1530.

Furthermore, the chip set 1510 connects the storage device 1540, the read/write device 1545, and the communications interface 1550. The storage device 1540 stores programs and data to be used by the CPU 1500 for the correlation display system 1. The storage device 1540 is, for example, a flash memory. The read/write device 1545 reads programs and/or data from a storage medium, which stores the programs and/or data, and stores the read programs and/or data in the storage device 1540. The read/write device 1545 acquires, for example, a specified program from a server on the Internet via the communications interface 1550 and stores the acquired program in the storage device 1540.

The communications interface 1550 executes transmission and reception of data to and from external devices via the communication network. Furthermore, when the communication network is disconnected, the communications interface 1550 can execute transmission and reception of data to and from the external devices without intermediary of the communication network. Then, the input device 1560 such as a keyboard, a tablet, and a mouse connects to the chip set 1510 via a specified interface.

A correlation display program, which is stored in the storage device 1540, for the correlation display system 1 is provided to the storage device 1540 via a communication network such as the Internet or a storage medium such as a magnetic storage medium or an optical storage medium. Then, the program, which is stored in the storage device 1540, for the correlation display system 1 is executed by the CPU 1500.

The correlation display program executed by the correlation display system 1 according to this embodiment acts on the CPU 1500 and makes the correlation display system 1 function as the communication data acquisition unit 10, the input unit 11, the analysis unit 12, the network analysis unit 14, the evaluation unit 16, and the display unit 18 as explained with reference to FIG. 1 to FIG. 3.

Advantageous Effects of Embodiment

When the amount of communication data transmitted from an information processing apparatus used by one person to an information processing apparatus used by another person is large, it does not necessarily mean that one person is highly related to the other person. However, the correlation display system 1 according to this embodiment can evaluate whether the communication data transmitted from the information processing apparatus of one person to the information processing apparatus of the other person is related to a predetermined event or not; and if the relevant communication data is related to the predetermined event, the correlation display system 1 can evaluate how highly or lowly the relevant communication data is related to the predetermined event, and then display the relationship between the respective persons. Accordingly, the correlation display system 1 can appropriately display the relationship between the persons who exchange information which may highly possibly be related to the predetermined event. Therefore, for example, when work such as discovery is to be performed, the correlation display system 1 can prioritize reference to the communication data transmitted and received by a person who is highly related to the predetermined event, and can thereby perform the discovery efficiently. Furthermore, the correlation display system 1 according to this embodiment can recognize the relationship between persons who are highly related to the predetermined event, so that it is possible to prevent important communication data for the work such as the discovery from being overlooked.

Furthermore, the system, method, and program according to embodiments of the present invention may be designed to display not only the relationship between persons, but also the relationship of domain information, organization position information, sex information, nationality, telephone communication information, chat communication, and so on.

Embodiments of the present invention have been described above; however, the aforementioned embodiments do not limit the invention according to the scope of claims. Also, it should be noted that all combinations of the features explained in the embodiments are not necessarily essential to the means for solving the problems of the invention. Furthermore, technical elements of the aforementioned embodiments may be applied solely or can be divided and applied to a plurality of parts such as program parts and hardware parts.

What is claimed is:

1. A display system for making a user recognize persons transmitting and receiving information related to a predetermined event over a network, wherein the display system comprises a memory and a processor, and wherein the display system:
acquires and analyzes whether text data related to the predetermined event are included in communication data transmitted and received between a plurality of terminals and associated with each of a plurality of persons by including information indicating transmission of the communication data from one person to another person;
determines a plurality of main terminals in the communication data from among the plurality of terminals on the basis of frequency at which the plurality of terminals appear in a shortest path between the plurality of terminals;
extracts a part of communication data from the communication data;
acquires coded communication data including the extracted communication data and scores each indicating how highly or lowly a different one of pieces of the extracted communication data is related to the predetermined event, wherein scores are produced by performing dictionary analysis on a result of morpheme analysis of text data included in the communication data;
adds scores to respective pieces of other communication data which are transmitted and received between the plurality of main terminals based on text data included in each piece of the coded communication data and in each piece of the other communication data, each of the scores indicating how highly or lowly a different one of the pieces of the other communication data is related to the predetermined event;
calculates sum of each of the scores added to the respective pieces of the other communication data, wherein each of the scores added to the respective pieces of the other communication data indicates correlation between the plurality of main terminals; and displays a plurality of main nodes which of each corresponds to the plurality of main terminals, wherein sizes of the plurality of main nodes are changed based on the sum of the each of the scores.

2. The display system according to claim 1, wherein the display system further displays the plurality of main nodes in a first period before a specified case and a second period after the specified case.

3. The display system according to claim 1, wherein the communication data includes domain information about the plurality of main terminals which transmits and receives the communication data; and
wherein the display system further determines the correlation on the basis of the domain information.

4. The display system according to claim 1, wherein the display system further displays the correlation between the plurality of main terminals on a display device.

5. The display system according to claim 1, wherein the display system further:
displays the correlation between the plurality of main terminals on a display device;
calculates the sum of the each of the scores at each of a plurality of times; and
changes a mode of the displayed correlation at the plurality of times on the basis of the sum of the each of the scores calculated at each of the plurality of times.

6. The display system according to claim 1, wherein the display system further changes color or shape of the displayed plurality of main nodes on the basis of the score.

7. The display system according to claim 1, wherein each of the scores added to the respective pieces of the other communication data indicates correlation between a first main terminal and a second main terminal among the plurality of main terminals, wherein the first main terminal and the second main terminal correspond to a first main node and a second main node, respectively, and wherein the display system further sets a display mode of the first main node and the second main node on the basis of the sum of the each of the scores.

8. The display system according to claim 1, wherein the display system further stores the sum of the each of scores added to the respective pieces of the other communication data in the memory.

9. The display system according to claim 1, wherein the communication data includes at least one of e-mails, a telephone call log, and a log of accesses to a social network service.

10. A display method implemented by a computer for executing data analysis and displaying a result of the data analysis,
wherein the computer comprises a memory and a processor, and the computer executes:
analyzing a communication network configured of a plurality of terminals;
acquiring and analyzing whether text data related to a predetermined event are included in communication data transmitted and received between the plurality of terminals;
determining a plurality of main terminals in the communication network from among the plurality of terminals on the basis of frequency at which the plurality of terminals appear in a shortest path between the plurality of terminals, each of a plurality of main nodes corresponding to the plurality of main terminals capable of transmitting and receiving data;
extracting a part of communication data from the communication data;
acquiring coded communication data including the extracted communication data and scores each indicating how highly or lowly a different one of pieces of the extracted communication data is related to the predetermined event, wherein scores are produced by performing dictionary analysis on a result of morpheme analysis of text data included in the communication data;
adding scores to respective pieces of other communication data which are transmitted and received between the plurality of main terminals based on text data included in each piece of the coded communication data and in each piece of the other communication data, each of the scores indicating how highly or lowly a different one of the pieces of the other communication data is related to the predetermined event;
calculating sum of each of the scores added to the respective pieces of the other communication data, wherein the each of the scores added to the respective pieces of the other communication data indicates correlation between the plurality of main terminals; and
displaying the plurality of main nodes, wherein sizes of the plurality of main nodes are changed based on the sum of the each of the scores.

11. A non-transitory computer-readable storage medium with a command stored therein for having a computer execute data analysis and display a result of the data analysis,
wherein the computer comprises a memory and a processor, and wherein the command includes:
analyzing a communication network configured of a plurality of terminals;
acquiring and analyzing whether text data related to a predetermined event are included in communication data transmitted and received between the plurality of terminals;
determining a plurality of main terminals in the communication network from among the plurality of terminals on the basis of frequency at which the plurality of terminals appear in a shortest path between the plurality of terminals, each of a plurality of main nodes corresponding to the plurality of main terminals capable of transmitting and receiving data;
extracting a part of communication data from the communication data;
acquiring coded communication data including the extracted communication data and scores each indicating how highly or lowly a different one of pieces of the extracted communication data is related to the predetermined event, wherein scores are produced by performing dictionary analysis on a result of morpheme analysis of text data included in the communication data;
adding scores to respective pieces of other communication data which are transmitted and received between the plurality of main terminals based on text data included in each piece of the coded communication data and in each piece of the other communication data, each of the scores indicating how highly or lowly a different one of the pieces of the other communication data is related to the predetermined event;
calculating sum of each of the scores added to the respective pieces of the other communication data, wherein the each of the scores added to the respective pieces of the other communication data indicates correlation between the plurality of main terminals; and displaying the plurality of main nodes, wherein sizes of the plurality of main nodes are changed based on the sum of the each of the scores.

* * * * *